3,564,090
ANTIBIOTIC MACARBOMYCIN AND PROCESS OF MAKING AND USING SAME
Hamao Umezawa, Kenji Maeda, Kazuo Nitta, Masanori Okanishi, and Sakiko Takahashi, Tokyo, Japan, assignors to Zaidan Hojin Biseibutsu Kagaku Kenkya Kai, Tokyo, Japan, a corporation of Japan
Filed Dec. 12, 1968, Ser. No. 783,325
Claims priority, application Japan, Dec. 18, 1967, 42/81,437
Int. Cl. A61k 21/00
U.S. Cl. 424—118    7 Claims

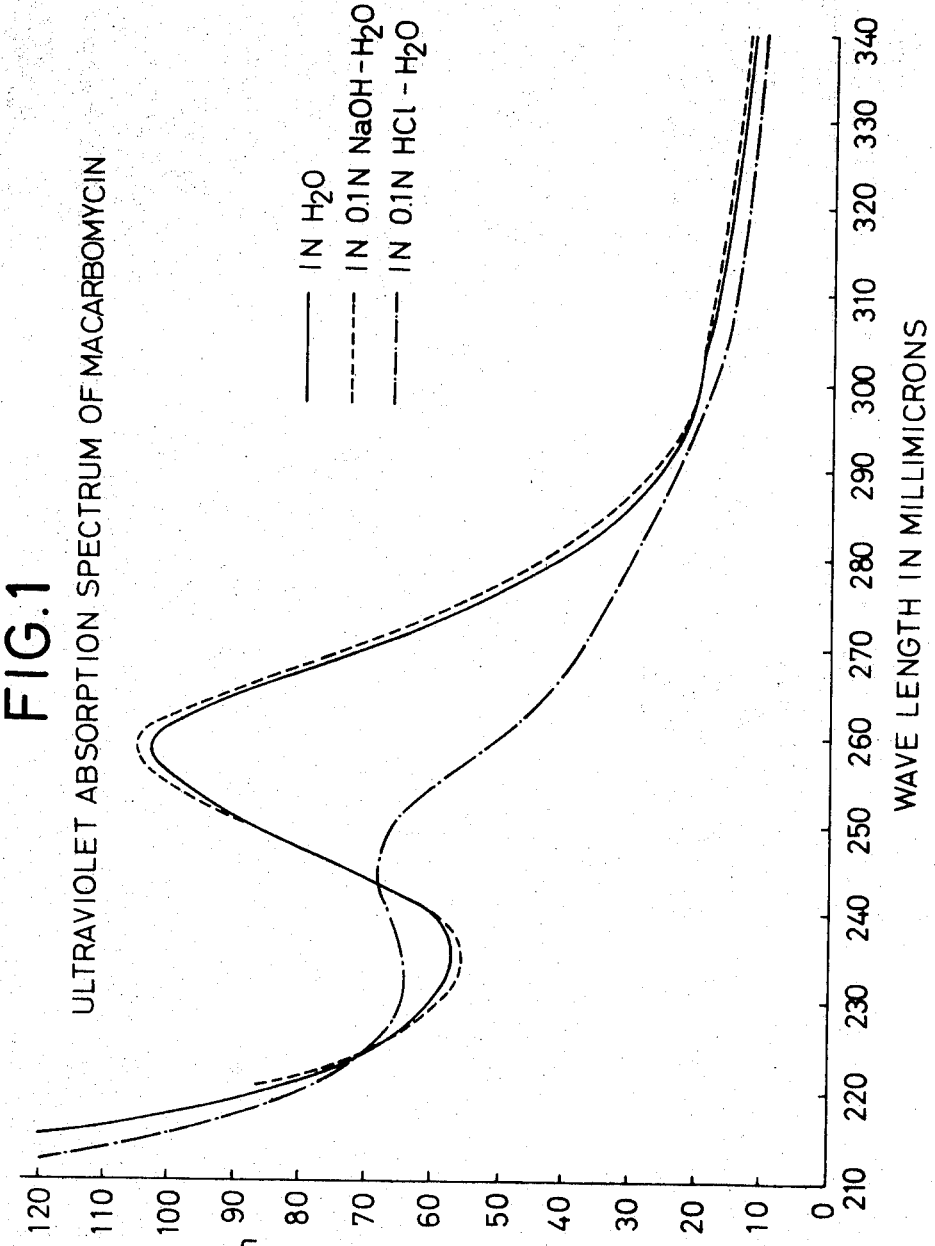

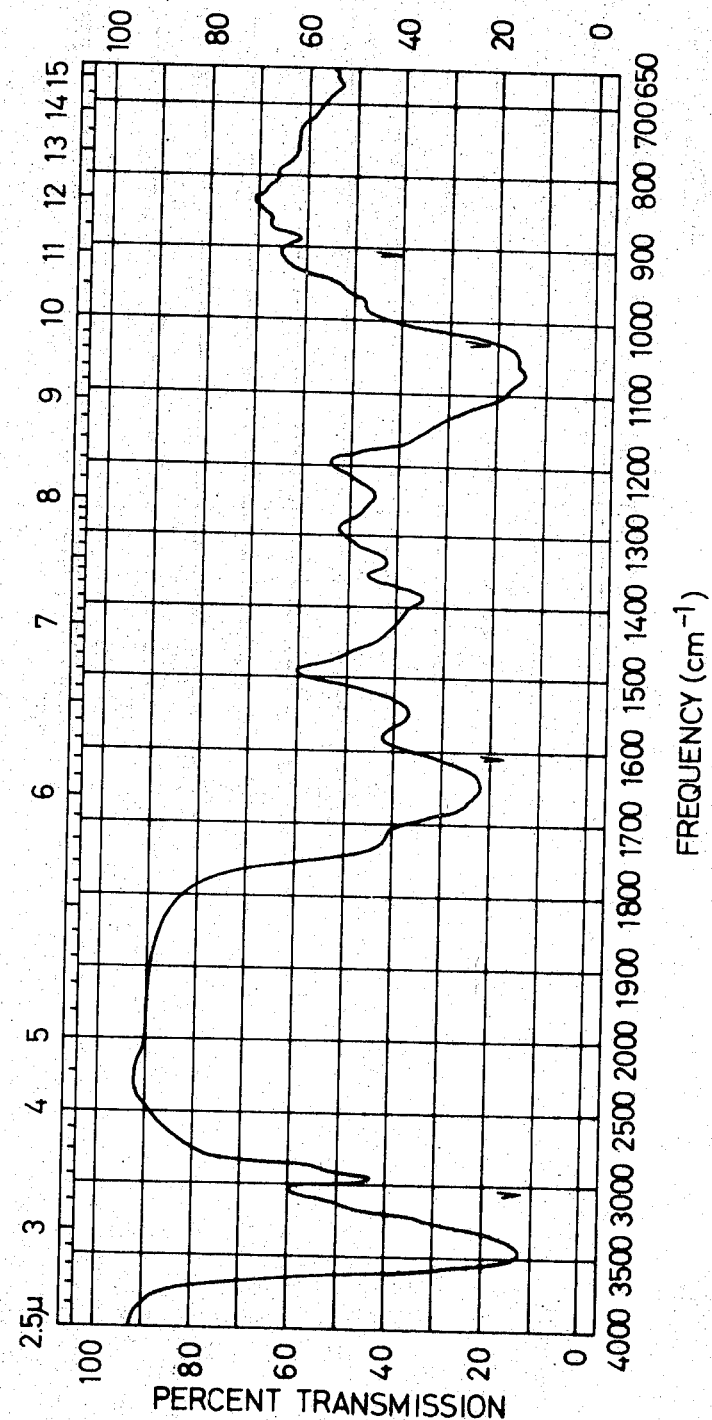

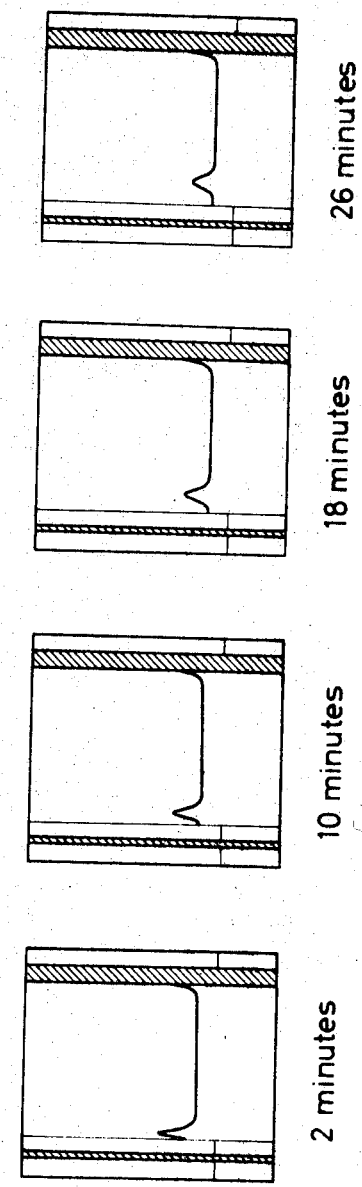

ABSTRACT OF THE DISCLOSURE

Macarbomycin inhibits the growth of various microorganisms e.g., Staphylococcus aureus including bacteria resistant against various drugs and exhibits growth promoting activity for animals. The antibiotic macarbomycin is produced by fermentation of species of Streptomyces which has been classified Streptomyces phaeochromogenes.

BACKGROUND OF THE INVENTION

(1) Field of the invention

This invention relates to a new antibiotic substance and to its production. More particularly, this invention relates to a new antibiotic substance designated macarbomycin and to a process for the preparation thereof by fermentation of a species of Streptomyces classified Streptomyces phaeochromogenes. This invention also relates to the recovery and purification of the antibiotic and its use for growth stimulant for animals.

(2) Description of the prior art

Various antibiotics are known in the art, however, there exists a need for additional antibiotics.

SUMMARY OF THE INVENTION

There is provided by the present invention the antimicrobial agent macarbomycin. The substance is produced by cultivating a macarbomycin-producing strain of Streptomyces phaeochromogenes in an aqueous carbohydrate solution containing at least one nitrogenous nutrient under submerged aerobic conditions until a substantial quantity of macarbomycin is formed in said solution. This invention embraces this antimicrobial agent in dilute solution, as crude concentrates, as crude solids and as purified solids, and its use for growth stimulant for animals.

DESCRIPTION OF THE DRAWINGS

FIG. 1 shows the ultraviolet absorption spectra of macarbomycin in $H_2O$, in 0.1 N naOH and in 0.1 N HCl.

FIG. 2 is the infrared absorption spectrum of macrarbomycin in potassium bromide.

FIG. 3 exhibits the sedimentation pattern obtained by sedimentation velocity method.

DETAILED DESCRIPTION

Macarbomycin inhibits growth of various Gram positive bacteria e.g., Staphylococcus aureus, Bacillus anthracis, Bacillus cereus, Bacillus mycoides and Mycobacterium phlei. The substance also inhibits growth of various drug-resistant Staphylococcus aureus. The substance is useful in wash solutions for sanitation purposes e.g., for washing hands and disinfecting of various laboratory, dental and medical equipment or other contaminated materials and as a bacteriostatic rinse for laundered clothes, furthermore, it is useful as growth promoting substance for animals. The antibiotic substance macarbomycin is obtained as a while to light yellow powder, does not show any clear melting point but decomposes at 190–200° C. with foaming, said substance exhibiting dextrorotation ($[\alpha]_D^{25}$ of its 0.5% aqueous solution $+9.0°$), being easily soluble in water, soluble in methanol and dimethyl-formamide, slightly soluble in ethanol, and scarcely soluble in acetone, n-butanol, ethyl acetate and benzene, but insoluble in n-hexane, exhibiting an absorption maximum of ultraviolet light at 258–269 m$\mu$ in aqueous solution $$E_{1\,cm.}^{1\%} = 103$$

and in 0.1 N NaOH solution $$E_{1\,cm.}^{1\%} = 105$$

and at 243–247 m$\mu$ in 0.1 N HCl solution $$E_{1\,cm.}^{1\%} = 68$$

exhibiting characteristic absorption bands in the infrared region when pelleted with potassium bromide at the following wave number in cm.$^{-1}$: 3400, 2930, 1730 (sh.), 1650, 1550, 1390, 1330, 1230, 1075, 1045, 970, 880, and 850, giving violet color by heating with 0.2% ninhydrin in 5% pyridine acetone solution, dark brown by Tollense, green by Benedict, and positive ornithine-HCl, and negative ferric chloride, Sakaguchi, and biuret reactions, giving a single pattern of $S_{20,w} = 4.46$ by ultracentrifugation of its 0.6% aqueous solution at 59,780 r.p.m. from which a molecular weight of 35,000 is calculated by Yphantis's method, having an elemental analysis of C, 45.74%; H, 6.79%; N, 5.06%; 0, 30.89%; P, 1.3% (Allen's method); Ash, 4.3%, and giving 1.36% of calcium by atomic Absorption Spectrophotometer (Perkin-Elmer, Model 303), and giving by hydrolysis 9.7% of hexose as determined by orcinol method, 14% of hexosamine as determined by Elson-Morgan's method, and 0.61% of pentose as determined by cysteine-$H_2SO_4$ method.

There is further provided according to the present invention the process for the production of the antibiotic macarbomycin which comprises cultivating a strain of Streptomyces phaeochromogenes in an aqueous medium containing carbon sources and nitrogen sources under aerobic conditions until a substantial amount of macarbomycin is accumulated in said solution. The organism producing the antibiotic of the present invention was isolated from a soil sample collected at Geneva, Switzerland and is a species, classified Streptomyces phaeochromogenes, of the genus Streptomyces. The culture was given the laboratory designation C715-7 in our laboratory. A culture of C715-7 was deposited in the culture collection of the A.T.C.C., under the deposition No. 21346 and also in the culture collection of the National Institute of Health, Tokyo, Japan and is available therefrom under accession No. NIHJ C715-7. A culture of C715-7 was deposited in the culture collection of the Fermentation Research Institute, Agency of Industry Science and Technology, the Ministry of International Trade and Industry, Inage, Chiba-city, Japan and is available therefrom under accession number 229.

The strain C715-7 has the following characteristics: When the colonies on Czapek's agar medium containing glycerol as the carbon source are examined microscopically, well branched substrate mycelia and long aerial hyphae are observed. Tip of the aerial hyphae forms chain of spores. No spiral or whorl are formed. The surface of the spore is smooth under electronmicroscopy. The characteristics on various media are described below.

(1) On glycerol nitrate agar, incubated at 27° C.: Yellowish brown growth with slightly orange colored aerial mycelium and produced brown pigment in substrate medium.

(2) On glucose asparagine agar, incubated at 27° C.: Blackish brown growth covered with slightly grayish to yellowish pink aerial mycelium and produced brown pigment in substrate medium.

(3) On starch agar, incubated at 27° C.: Brown to blackish brown growth covered with yellowish pink aerial mycelium having grayish tinge and produced brown pigment in substrate medium. Weak or no hydrolysis of starch.

(4) On Bennet agar, incubated at 27° C.: Blackish brown growth covered with grayish orange to pale orange colored aerial mycelium and produced brown pigment in substrate mycelium.

(5) On yeast extract-malt extract agar, incubated at 27° C.: Blackish brown growth covered with yellowish pink aerial mycelium having grayish tinge and produced brown pigment in substrate medium.

(6) On Oatmeal agar, incubated at 27° C.: Blackish brown growth covered with slightly orange colored aerial mycelium and produced brown pigment in substrate medium.

(7) In peptone solution (containing 0.2% $NaNO_3$), incubated at 27° C.: Blackish brown growth and produced brown soluble pigment and nitrate in the medium was reduced.

(8) On gelatin stab, cultured at 27° C.: Brown soluble pigment was produced and liquefaction of gelatine was observed.

(9) In skimmed milk, incubated at 37° C.: Brown growth but showed no peptonization.

(10) Utilization of carbohydrates for growth on Pridham-Cottlieb's basal medium, incubated at 27° C.: Glucose, arabinose, fructose, mannose, xylose, inositol, mannitol, rhamnose, lactose, sucrose, raffinose and starch were utilized. Cellulose was not utilized.

Summarizing the above characteristics of the strain C715–7, the strain belongs to the genus Streptomyces of which spore has smooth surface and in which neither spiral nor whorl are produced. It is of a chromogenic type producing brown pigment in media.

Among the known species of Streptomyces, S. venezuelae, S. noboritoensis S. melanogenes and S. phaeochromogenes seemed to have characteristics common to the strain C715–7. The strain can be differentiated from S. venezuelae in such respects as lack of raffinose utilization, strong proteolytic activity and strong nitrate reduction of the latter. It is distinguishable from S. noboritoensis, by lack of brown pigmentation of the latter on synthetic agar media. It is also differentiated from S. melanogenes in respects such as coloration of the growth, lack of rhamnose utilization and strong nitrate reduction of the latter. The strain C715–7 resembles mostly S. phaeochromogenes except that slight difference is observed in coloration of aerial mycelium between them. S. phaeochromogenes was stated to have spirals according to Waksman, Jensen and Krasilnikov, but Kutzner observed 20 of 25 strains of S. phaeochromogenes have no spiral and Ettlinger observed no spiral (described in P.257, The Actinomycetes, Waksman 1962). Thus, the strain C 715–5 is decided to belong to Streptomyces phaeochromogenes Conn 1917. Since the Streptomyces are easily mutatable naturally or artificially, it is to be understood that S. phaeochromogenes used in the present invention includes not only the typical strain described above but also all natural and artificial variants and mutants thereof. Thus, by the term "Streptomyces phaeochromogenes" as used according to the present invention we mean all strains which produce macarbomycin, except those which produce no macarbomycin and which can be absolutely differentiated therefrom.

Streptomyces phaeochromogenes when grown under suitable conditions produces macarbomycin. A fermentation broth containing macarbomycin is prepared by inoculating spores or mycelia of the macarbomycin-producing organism into a suitable medium and then cultivating under aerobic conditions. For production of macarbomycin, cultivation on a solid medium is possible, but for production of large quantities of the antibiotic submerged cultivation in a liquid medium is preferred. Any fermentation temperature can be employed within the range in which the macarbomycin-producing organism can grow, although 27° C.–30° C. is preferred. Media consisting of known kinds of nutritional sources for actinomycetes are useful for the production of macarbomycin. For example, for the production of macarbomycin, commercially available products such as glycerol, glucose, starch, dextrin, maltose, lactose, sucrose, molasses, oil, fats lipids and the like are useful as the carbon sources in either purified or crude state. Commercially available products such as soybean meal, meat extract, peptone, yeast extract, distiller's solubles, peanut powder, cotton seed powder, fish powder, corn steep liquor, casein, nitrates, ammonium salt, urea and the like are useful as the nitrogen source. Inorganic salts such as sodium chloride, potassium chloride, magnesium chloride, calcium carbonate, phosphate or other salts, and a small amount of heavy metal salts such as copper, manganese, iron, zinc and the like are added, if desired. Any materials which are useful for the growth of Streptomyces can be used. Antifoam agents such as silicon oil, soybean oil, fat or other agents which are useful in processes for the production of penicillin or streptomycin can also be employed with advantage.

A series of tests was carried out for the production of macarbomycin, for which, unless stated otherwise, there were employed the method of cultivatin and the assay method as detailed below:

(1) Shaking flask culture: 100 ml. of medium placed in a flask of 500 ml. capacity is sterilized at 120° C. for 20 minutes. Spores or mycelia of the macarbomycin-producing organism are inoculated into the sterilized medium and cultivated at 27° C. for 48 hrs. on a reciprocal shaking machine (120 strokes per minute, 8 cm. amplitude). 2 ml. of the cultured broth obtained is used as inoculum for new medium which has been perpared in the same way as above.

(2) Tank Culture: 40 liters of medium is prepared in a 70 l. fermentor and sterilized at 120° C. for 30 minutes. The sterilized medium is inoculated with 800 ml. of the cultured broth which was previously shake-cultured for 2 days. The fermentation in the tank-proceeds under aeration of 40 liters sterile air per minute, with stirring at 300 r.p.m. Silicone oil and soybean oil are used for antifoaming.

(3) Assay of macarbomycin: Macarbomycin exhibits an inhibition zone on an agar plate inoculated with Staphyococcus aureus strain No. 193, which is resistant to various antibiotics. As in the penicillin assay, unknown activity of macarbomycin are determined by the cylinder plate or disc method using certain activity of macarbomycin as the standard. The standard macarbomycin is standardized as 1,000 mcg./mg. The medium for the assay consists of 0.5% meat extract, 1% pepton,. 0.5% sodium chloride, and 1.5% agar and is adjusted to pH 7.0. To 100 ml. of this melted agar medium was added 2 ml. of the cultured inoculum broth of Staphylo coccus aureus strain No. 193 which was previously cultured for 24 hrs. in a sterilized medium consisting of 1% meat extract, 2% glucose, 1% peptone and 0.3% sodium chloride (pH 7.0) and it was used for preparation of the seed layer.

The macarbomycin-producing strain was first shake-cultured in the following medium.

The medium contained 1% glucose, 1% starch, 1.5% soybean meal, 0.1% $KH_2PO_4$, 0.1% $MgSO_4 \cdot 7H_2O$, 0.3% NaCl, 0.0007% $CuSO_4 \cdot 5H_2O$, 0.0001% $FeCl_3 \cdot 6H_2O$, 0.0008% $MnCl_2 \cdot 4H_2O$, and 0.0002% $ZnSO_4 \cdot 5H_2O$, and was adjusted to pH 7.0.

The cultured broth (pH 6.8) at the 5th day exhibited an inhibition diameter of 20.0 mm. on the plate inoculated with Staphylococcus aureus strain No. 193.

Macarbomycin was produced in media containing various carbon and nitrogen sources under shaking conditions. The operation conditions of the tests were as follows:

Test (1): Various carbon sources were added to the basal medium containing 1.5% soybean meal, 0.1%

$K_2HPO_4$, 0.1% $MgSO_4 \cdot 2H_2O$, and 0.3 NaCl. The results obtained are shown in Table 1.

TABLE 1

| Additive to basal medium | 3rd day | | 4th day | | 5th day | | 6th day | | 7th day | |
|---|---|---|---|---|---|---|---|---|---|---|
| | pH | Mcg./Ml. | pH | Mcg./ml. | pH | Mcg./ml. | pH | Mcg./ml. | pH | Mcg./ml. |
| 1% starch plus 1% glucose | 4.8 | 0 | 6.0 | 0 | 6.0 | 22.2 | 7.0 | 31.0 | 8.2 | 23.8 |
| 2% glucose | 4.8 | 0 | 4.4 | 0 | 4.8 | 0 | 5.6 | 0 | 8.0 | 18.4 |
| 2% starch | 6.4 | 39.0 | 5.8 | 54.0 | 6.6 | 48.0 | 7.0 | 35.0 | 8.0 | 37.8 |
| 2% sucrose | 6.6 | 0 | 6.4 | 11.0 | 6.5 | 31.2 | 6.6 | 36.6 | 7.2 | 23.8 |
| 2% maltose | 6.6 | 0 | 6.6 | 3.6 | 6.8 | 20.3 | 7.0 | 44.2 | 7.0 | 26.0 |
| 2% lactose | 6.6 | 0 | 6.4 | 4.9 | 6.4 | 19.3 | 6.4 | 44.2 | 6.0 | 30.5 |
| 2% glycerol | 6.6 | 0 | 6.6 | 0 | 6.6 | 11.9 | 6.0 | 12.5 | 7.0 | 20.6 |
| 2% soluble starch | 6.6 | 20.3 | 6.0 | 57.0 | 6.2 | 25.0 | 7.0 | 34.4 | 8.2 | 37.2 |

Test (2): Various carbon sources (2%) were added to the basal medium containing 2% soybean meal, 0.05% $MgSO_4 \cdot 7H_2O$, 0.1% $K_2HPO_4$, 0.3% NaCl, 0.00035% $CuSO_4 \cdot 5H_2O$, 0.00005%, $FeCl_3 \cdot 6H_2O$, 0.0004% $MnCl_2 \cdot 4H_2O$, 0.0001% $ZnSO_4 \cdot 5H_2O$, and 0.02% silicone (Shinetsu Chemicals Co., Ltd. KM–70). The results obtained are shown in Table 2.

Test (3): The basal medium containing 2% starch, and 0.3% NaCl was used. The results obtained are shown in Table 3.

TABLE 3

| Additive to basal medium | 4th day | | | 5th day | | | 6th day | | | 7th day | | |
|---|---|---|---|---|---|---|---|---|---|---|---|---|
| | pH | Sup., mcg./ml. | Ppt., mcg./ml. | pH | Sup., mcg./ml. | Ppt., mcg./ml. | pH | Sup., mcg./ml. | Ppt., mcg./ml. | pH | Sup., mcg./ml. | Ppt., mcg./ml. |
| 1.5% soybean meal, 0.1% $MgSO_4 \cdot 7H_2O$, 0.1% $K_2HPO_4$ | 6.4 | 13.5 | 23.5 | 6.6 | 13.8 | 20.4 | 6.8 | 23.4 | 31.7 | 6.8 | 14.8 | 70.2 |
| 1.5% cotton seed meal, 0.3% casein | 5.4 | 0 | 24.0 | 6.6 | 0 | 10.0 | 7.2 | 21.0 | 49.0 | 7.2 | 10.1 | 22.9 |
| 0.75% meat extract, 0.75% peptone | 8.4 | 0 | 0 | 8.4 | 0 | 0 | 8.6 | 0 | 0 | 9.5 | 0 | 0 |
| 1.0% meat extract, 0.3% yeast extract | 7.6 | 8.1 | 0 | 8.2 | 0 | 0 | 8.2 | 0 | 0 | 8.5 | 0 | 12.3 |
| 1.5% soybean meal, 0.05% $MgSO_4 \cdot 7H_2O$, 0.2% $(NH_4)_2SO_4$, 0.1% $K_2HPO_4$ | 6.2 | 7.5 | 16.6 | 4.8 | 0 | 0 | 4.8 | 0 | 19.0 | 4.8 | 12.8 | 51.2 |
| 1.5% soybean meal, 0.05% $MgSO_4 \cdot 7H_2O$, 0.2% $CaCO_3$ 0.1% $K_2HPO_4$ | 7.0 | 7.0 | 30.2 | 6.8 | 15.1 | 22.0 | 6.8 | 22.0 | 30.8 | 6.8 | 24.2 | 55.6 |
| 1.5% soybean meal, 0.1% $MgSO_4 \cdot 7H_2O$, 0.02% silicon soil, 0.1% $K_2HPO_4$ | 6.4 | 0 | 20.0 | 6.8 | 13.3 | 41.5 | 7.0 | 15.8 | 26.2 | 7.0 | 25.0 | 65.6 |
| 1.5% soybean meal, 0.05% $MgSO_4 \cdot 7H_2O$, 0.1% $K_2HPO_4$, 0.3% casein | 5.8 | 0 | 0 | 6.4 | 11.7 | 19.5 | 6.8 | 22.0 | 55.5 | 7.0 | 23.0 | 36.6 |

Test (4): The basal medium containing 2.0% soluble starch, 2.5% soybean meal, and 0.3% NaCl was used.

TABLE 2

| Additive to basal medium | 5th day | | | 6th day | | | 7th day | | | 8th day | | |
|---|---|---|---|---|---|---|---|---|---|---|---|---|
| | pH | Sup.[1], mcg./ml. | Ppt.[2], mcg./ml. | pH | Sup., mcg./ml. | Ppt., mcg./ml. | pH | Sup., mcg./ml. | Ppt., mcg./ml. | pH | Sup., mcg./ml. | Ppt., mcg./ml. |
| Sucrose | 5.5 | 0 | 4.6 | 6.0 | 8.2 | 15.5 | 6.7 | 36.0 | 32.7 | 8.0 | 45.0 | 47.6 |
| Glucose | 6.0 | 0 | 0 | 6.5 | 0 | 5.5 | 7.0 | 7.1 | 10.7 | 8.0 | 13.0 | 22.6 |
| Starch | 6.3 | 7.8 | 15.3 | 6.0 | 23.4 | 24.2 | 6.6 | 53.8 | 6.2 | 6.5 | 45.0 | 49.6 |

[1] Fermented broth was separated by centrifuge and macarbomycin present in supernatant was indicated as "Sup."
[2] Fermented broth was adjusted to pH 3 and precipitation was collected with mycelia by centrifuge and extracted with methanol. Macarbomycin present in methanol (the same volume of the fermented broth) was indicated as "Ppt."

The results obtained are shown in Table 4.

TABLE 4

| No of medium | Additive to basal medium | 5th day | | | 6th day | | | 7th day | | | 8th day | | |
|---|---|---|---|---|---|---|---|---|---|---|---|---|---|
| | | pH | Sup., mcg./ml. | Ppt., mcg./ml. | pH | Sup., mcg./ml. | Ppt., mcg./ml. | pH | Sup., mcg./ml. | Ppt., mcg./ml. | pH | Sup., mcg./ml. | Ppt. mcg./ml. |
| 1 | 0.05% $MgSO_4 \cdot 7H_2O$, 0.1% $K_2PO_4$, 0.02% silicon, 0.05% trace metals.[1] | 6.3 | 29.5 | 42.0 | 6.0 | 47.8 | 75.5 | 6.5 | 71.0 | 53.0 | 7.4 | 61.5 | 80.0 |
| 2 | Medium No. 1 free from 0.05% $MgSO_4 \cdot 7H_2O$. | 6.5 | 24.0 | 26.0 | 6.5 | 41.7 | 63.0 | 7.0 | 71.0 | 59.0 | 7.6 | 69.5 | 73.5 |
| 3 | Medium No. 1 plus 0.3% $CaCO_3$. | 6.2 | 18.8 | 26.0 | 6.5 | 24.0 | 38.4 | 6.5 | 34.0 | 28.8 | 7.5 | 39.4 | 41.0 |
| 4 | Medium No. 1 free from 0.1% $K_2PO_4$. | 6.0 | 21.4 | 27.8 | 6.0 | 15.1 | 54.7 | 6.5 | 52.5 | 84.0 | 7.5 | 72.5 | 64.0 |
| 5 | Medium No. 4 plus 0.2% $K_2PO_4$ at 3 days culture. | 7.0 | 32.8 | 28.6 | 7.0 | 42.8 | 50.0 | 7.0 | 57.6 | 89.5 | 7.5 | 45.6 | 68.7 |
| 6 | Medium No. 1 free from 0.05% trace metals. | 6.5 | 28.0 | 28.6 | 6.5 | 40.2 | 56.0 | 6.5 | 51.0 | 61.6 | 7.0 | 45.6 | 83.0 |
| 7 | Medium No. 1 free from 0.02% silicon but added with 1.0% soybean oil. | 6.2 | 28.0 | 41.6 | 6.5 | 14.3 | 44.7 | 6.0 | 44.8 | 42.6 | 6.5 | 15.9 | 73.5 |

[1] Trace metals: A solution containing 0.007 g. of $CuSO_4 \cdot 5H_2O$, 0.001 g. of $FeSO_4 \cdot 7H_2O$, 0.008 g. of $MnCl_2 \cdot 4H_2O$ and 0.002 g. of $ZnSO_4 \cdot 7H_2O$ in 1,000 ml. of distilled water.

As will be seen from the above results, it can be said that carbon sources such as starch, sucrose, maltose or lactose are favorable for the production of macarbomycin and that nitrogen sources such as soybean meal or cotton seed meal are examples of suitable nitrogen sources.

The medium consisting of 2.0% sucrose, 2.5% soybean meal, 0.5% $MgSO_4 \cdot 7H_2O$, 0.1% $K_2HPO_4$, 0.3% NaCl, 0.0007% $CuSO_4 \cdot 5H_2O$, 0.0001% $FeSO_4 \cdot 7H_2O$, 0.0008% $MnCl_2 \cdot 4H_2O$, 0.0002% $ZnSO_4 \cdot 7H_2O$, and 0.02% silicone (pH 7.0) is one of the media suitable for the production of macarbomycin.

In general, macarbomycin is poorly produced in synthetic media, and produced well in a medium containing natural carbon and nitrogen sources. The pH at the maximum production varies depending on compositions of media employed.

As with the known antibiotics it may be expected that higher production of macarbomycin can be achieved by the selection of highly productive strains after single colony selection, or by the treatment of a macarbomycin-producing strain with various mutagens such as ultraviolet light, X-ray or chemical mutagens.

The recovery of macarbomycin is now described below. Macarbomycin exists both in liquid part and in solid part with mycelia of the fermented broth. When the whole fermented broth is adjusted to pH of about 3, substantially all of the macarbomycin dissolved in precipitated. The precipitate together with the solid part containing mycelia is separated from the broth by filtration. A filter aid such as diatomaceous earth is helpful for filtration. As another procedure, the liquid part of the fermented broth is separated at neutral pH by filtration or centrifugation, and is adjusted to pH of about 3 by the addition of acid such as hydrochloric acid to precipitate macarbomycin. Thereafter, macarbomycin present in the filter cake is extracted out with suitable solvent such as 70% aqueous acetone. The extract is concentrated to dryness under reduced pressure giving crude powder of macarbomycin. The crude powder and the precipitate at acid are extracted with acetone to remove impurities. The residual solid is suspended in distilled water and neutralized with sodium hydroxide to obtain an aqueous solution of macarbomycin. The solution is lyophilized to yield a crude powder of cacarbomycin. Alternatively macarbomycin which was precipitated by addition of acid can be extracted by organic solvent such as n-butanol. The yield is, however, inferior to the process described just above, that is, the process which comprises removing impurities by extraction with acetone, neutralizing, and lyophilizing. The crude powder obtained is absorbed on a column containing a weak basic ionic exchanger such as DEAE-cellulose (OH cycle, produced by Brown Co., Ltd.). The column is developed with water, formic acid, and formic acid-ammonium buffer (pH 8) eluting impurities, and developed with diluted aqueous ammonia to elute macarbomycin. The active eluate is passed through a column of Sephadex G–50 to remove more impurities containing inorganic salts. The main active fraction purified by Sephadex G–50 is dissolved with pH 8.1 Tris buffer, and adsorbed on a column containing ECTEOLA cellulose (manufactured by Brown Co., Ltd., or Serva Co., Ltd.) which is pretreated with the same buffer. The column is eluted by gradient chromatography with 0–0.2 M NaCl in the same buffer and the active fraction was desalted by Sephadex G–50 or G–15 yielding pure macarbomycin. Macarbomycin is also purified by silica gel chromatography developed with suitable solvent such as chloroform-methanol.

The antibacterial spectrum of macarbomycin was determined by the agar dilution method and tabulated below.

TABLE 5.—ANTIBACTERIAL SPECTRUM OF MACARBOMYCIN

| Test organism: | Minimum inhibitory concentration (mcg./ml.) |
|---|---|
| Staphylococcus aureus FDA 209P parent | 0.8 |
| Staphylococcus aureus FDA 209P resistant to streptomycin and streptothricin | 0.8 |
| Staphylococcus aureus FDA 209P resistant to amphomycin | 1.6 |
| Staphylococcus aureus FDA 209P resistant to telomycin | 1.6 |
| Staphylococcus aureus FDA 209P resistant to novobiocin, penicillin, streptomycin, tetracycline, erythromycin, and chloramphenicol | 1.6 |
| Staphylococcus aureus FDA 209P resistant to bryamycin | 6.3 |
| Staphylococcus aureus FDA 209P resistant to grisein | 1.6 |
| Staphylococcus aureus 2–8 resistant to penicillin, streptomycin, tetracycline, capreomycin, and sulfa drugs | 0.8 |
| Staphylococcus aureus FDA 209P resistant to actinomycin | 6.3 |
| Staphylococcus aureus strain 193 parent | 1.6 |
| Staphylococcus aureus strain 193 resistant to erythromycin | 1.6 |
| Staphylococcus aureus strain 193 resistant to erythromycin and chloramphenicol | 1.6 |
| Staphylococcus aureus #52–34 | 0.8 |
| Staphylococcusaureus Terajima | 1.6 |
| Staphylococcus aureus Smith strain | 1.6 |
| Bacillus subtilis PCI 219 | >100 |
| Bacillus subtilis NRRL B558 | >100 |
| Bacillus megaterium | >100 |
| Bacillus anthracis | 0.05 |
| Bacillus cereus ATCC 10702 | 0.05 |
| Bacillus mycoides strain "O" | 0.1 |
| Bacillus sphericus | 50 |
| Micrococcus flavus M–16 | 25 |
| Sarcina lutea PCI 1001 | >100 |
| Corynebacterium xerosis 53–K1 | 100 |
| Escherichia coli NIHJ | >100 |
| Escherichia coli B | 50 |
| Klebsiella pneumoniae 602 | >100 |
| Salmonella typhimurium 1046 | >100 |
| Salmonella paratyphi A 1015 | >100 |
| Salmonella paratyphi B 8006 | >100 |
| Salmonella paratyphi C | >100 |
| Salmonella cholerae suis 1348 | >100 |
| Shigella enteritidis | >100 |
| Shigella dysenteriae A | 100 |
| Shigella flexneri FW 82a–1701 | >100 |
| Shigella boydii I–65 | 100 |
| Shigella sonnei 11, 37148 | >100 |
| Pseudomonas pyocyaneus | 100 |
| Mycobacterium 607 | [1]50 |
| Mycobacterium 607 resistant to kanamycin | [1]50 |
| Mycobacterium 607 resistant to streptomycin | [1]25 |
| Mycobacterium phlei | [1]1.6 |
| Aspergillus niger | [2]100 |
| Trichophyton mentagrophytes | [2]>100 |
| Saccharomyces cerevisiae | [2]>100 |
| Torula utilis | [2]>100 |
| Piricularia oryzae | [2]>100 |
| Xanthomonas oryzae | [2]>100 |

[1] 1% glycerol nutrient agar used.
[2] 1% glucose nutrient agar used.
Nutrient agar was used for other test organisms.

Macarbomycin inhibited the growth of Staphylococcus aureus 308A–1 and the resistant strain to endnacidin in bouillon at 0.2 and 0.78 mcg./ml., respectively. The inhibitory activity in bouillon method of macarbomycin against *Staphylococcus aureus* was weakened to 20, 40 and 80 times by the addition of horse serum or human serum at 5, 10, and 20%, respectively. Among components in serum, γ-globulin and fiibrinogen had no effect weakening activity, but albumin had.

When macarbomycin of 1000 mcg./kg. was administered to mice intravenously, no toxicity was observed. The intraperitoneal administration of 5 and 1.25 mg./kg. to mice infected by *Staphylococcus aureus* Smith strain recover at the rate of 100 and 50%, respectively, as compared to the control mice which received no macarbomycin. The subcutaneous injection of 50 and 25 mg./kg. showed 50 and 25% recovery. The oral administration of 200 mg./kg. showed 25% recovery.

Because of the low toxicity, strong antibacterial activity of macarbomycin, macarbomycin is useful for the treatment of bacterial disease and for disinfecting. In addition, it is promising as a useful additive to feed, because it is of a high molecular weight and is not absorbed by feed.

The properties of macarbomycin described above resemble moenomycin and prasinomycin among known antibiotics which inhibit Gram-positive bacteria and have high molecular weight with phosphorous. Moenomycin has found to be produced by four different kinds of strains. (Walkausser, K. H., G. Nesmann, P. Prave and A. Steigler: Antimicrobial Agents and Chemotheraphy, 1965, pp. 734–736). Two of them, *Streptomyces banbergiensis* and *Streptomyces ghanaensis* having hairy or spiny surface of spore and greenish colored aerial mycelium are differentiated from *Streptomyces phaeochromogenes* producing macarbomycin. *Streptomyces enderensis*, one of the producers of moenomycin is also differentiated from *Streptomyces phaeochromogenes* in gray colored aerial mycelium of the former. Another producer of moenomycin, *Streptomyces geysiriensis* can be distinguishable from the claimed strain of macarbomycin producer in gray aerial mycelium and spiral formation on sporophore of the former. The producer of prasinomycin, *Streptomyces prasinus* (Weisenborn, F. L., J. L. Bouchard, D. Smith, F. Pansey, G. Maestrone, G. Miraglla and E. Meyer: Nature, pp. 1092–1094, March 18, 1967) can be differentiated from *Streptomyces phaeochromogenes* of macarbomycin producer in greenish colored aerial mycelium.

Moenomycin supplied by courtesy of Farbwerke Hoechist AG., Frankfurt am Main, Germany and prasinomycin supplied by courtesy of the Squibb Institute for Medical Research, New Brunswick, N.J., U.S.A. were compared with macarbomycin in the following respects, and differentiated from macarbomycin.

(1) On paper chromatography using n-butanol-pyridine-water (4:1:4 by volume) and the same procedure as described by F. L. Weisnborn et al., macarbomycin gave one main spot at Rf 0.29 with two minor spots at Rf 0.47 and 0.56, while moenomycin gave three spots at Rf 0.29, 0.38 and 0.64 with a minor spot at Rf 0.47, and prasinomycin gave 5 spots at Rf 0.29, 0.35, 0.47, 0.64 and 0.76.

(2) On thin-layer chromatography of Silica gel GF$_{254}$ (E. Merck AG, Darmstadt, Germany), antibiotics were resolved with n-propanol 2 N aqueous ammonia (70:30 by volume) and detected by ultraviolet light at 253.6 mμ, by spraying with chlorosulfonic acid-acetic acid (1:2) or by exposing in the vapour of iodine. Macarbomycin gave one main spot at Rf 0.25 with two minor spots at Rf 0.33 and 0.47, while moenomycin gave two main spots at Rf 0.25 and 0.33 with two minor spots at Rf 0.41 and 0.47, and prasinomycin gave three main spots at Rf 0.25, 0.33 and 0.41 with a minor spot at Rf 0.47. The main spot of macarbomycin was detected at the position corresponding to moenomycin B$_1$ and prasinomycin A. The spot of macarbomycin showed strong UV-absorption, although those of moenomycin B$_1$ and prasinomycin A exhibited weak or no absorption.

(3) By the cylinder disc method using *Staphylococcus aureus* strain 193, the ratio of activity per milligram between moenomycin and macarbomycin was ca. 1.5:1, and that between prasinomycin and macarbomycin was ca. 1:1. However, prasinomycin C showed ½ activity of macarbomycin. By the bouillon dilution method using *Staphylococcus aureus* 209–P, moenomycin and prasinomycin were 2–4 times more active than macarbomycin. On the ultraviolet absorption spectra in aqueous solution at 258 mμ, macarbomycin shows $$E^{1\%}_{1\,cm.} = 103$$

while moenomycin and prasinomycin gave 67.5 and 57.5, respectively.

(4) Macarbomycin, moenomycin and prasinomycin were respectively hydrolyzed in 2 N HCl at 100° C. for 3 hours. The composition of sugars in hydrolyzates was separated by ascending paper chromatography with n-butanol-pyridine-water (6:4:3 by volume), and detected by ammoniacal AgNO$_3$, Elson-Morgan or ninhydrin reagents. Five spots at Rf 0.25 corresponding to D-glucosamine, 0.33 to glucose, 0.77, ca. 0.1 and ca. 0.05 were detected in all three hydrolysates. Rf 0.45 corresponding to 2-amino-2, 6-dideoxy-D-glucose was detected in hydrolysates of moenomycin and prasinomycin, but was not in that of macarbomycin.

As the results above show, macarbomycin has strong antibacterial activity and is clearly different from moenomycin and prasinomycin, and it is differentiated from known antibiotics in respect to its strong antibacterial activity and its high molecular weight with phosphorus.

Macarbomycin is useful and effective in promoting the growth of animals. It can be supplied to all poultries and stock or domestic animals which comprises chicken, turkey, pig, sheep and cattle. Addition of macarbomycin is adequate in a proportion of 0.0001 to 0.01% in a feed or drinking water which is fed to poultry or stock animals. In such proportion of addition, there is not observed any side effect to the animals. It is also possible to supply macarbomycin to the animals directly as such or in admixture with appropriate diluent.

According to a third aspect of the present invention, therefore, there is provided a process of promoting the growth of poultry and stock animals which comprises supplying an effective amount of macarbomycin to them.

The present invention is now illustrated with reference to examples. However, examples are merely illustrative and it should be understood that the present invention is not limited thereto.

Example 1.—A medium (125 ml.) consisting of starch 2%, soybean meal 1.5%, K$_2$HPO$_4$ 0.1%, MgSO$_4$·7H$_2$O 0.1%, and NaCl 0.3% (pH 7.0) was placed in a shaking flask of 500 ml. capacity and sterilized at 120° C. for 20 minutes. To this sterilized medium, the C715–7 strain of *Streptomyces phaecochromogenes* was inoculated from an agar slant culture by platinum loop. Incubation proceeded on a reciprocal shaking machine for 2 days at 27° C. An inoculum of 2 ml. of the broth was used for the next culture. Thirty flasks containing the medium which was prepared as above were inoculated as above and shake-cultured at 28° C. for 4 days and yielded 3,030 ml. of broth filtrate containing macarbomycin at 25 mcg./ml. The filtrate was adjusted to pH 3 with 1 N HCl and the precipitate formed was filtered. The precipitate was dissolved with 0.1 N NaOH and lyophilized, yielding 2.137 g. (39 mcg./mg.) of a powder. The powder was washed with acetone and ether, the residue was extracted with aqueous 70% acetone. The extract was concentrated under reduced pressure and lyophilized to obtain 587.1 mg. (97 mcg./mg.) of a black powder. The yield was 74.5%.

On the other hand, the solid part containing mycelia was extracted with 670 ml., 470 ml., and 300 ml. of aqueous 70–80% acetone, affording 1,140 ml. of active eluate (129 mcg./ml.). The extract was concentrated and lyophilized, yielding 985.4 mg. (134 mcg./mg.) of powder. The powder was washed with acetone and ether to obtain 639.9 mg. (210 mcg./mg.) of a black powder at 91.5% yield.

Example 2.—The crude powder (492 mg., 390 mcg.) obtained by the procedure as described in Example 1 was purified by chromatography with ECTEOLA cellulose. A column (2 cm. in diameter) was filled with ECTEOLA cellulose (OH cycle) in 33 cm. length, and washed thoroughly with 0.01 M Tris buffer (pH 7.7). The crude powder was dissolved in a small amount of the same buffer, and poured into the column. The column was linear-gradiently eluted with 0–0.2 M NaCl in 0.0 M Tris buffer (each 400 ml.). After the eluate was collected in 10 ml. fractions, the activity of each portion was measured and combined as the following; Frs. 1–3 had no activity, Frs. 4–8 was assigned to F–1, Frs. 9–16 had no activity, Frs. 17–28 was assigned to F–2, Frs. 29–37 to F–3, Frs. 38–47 to F–4, Frs. 48–62 to F–5, Frs. 63–70 to F–6, and Frs. 71–80. Each fraction was treated with Sephadex G–25, and lyophilized yielding white powder as the following: F–1; 200 mg., 47 mcg./mg., F–2; 276 mg., 1410 mcg.mg., F–3; 3.6 mg., 1140 mcg./mg. F–4; 8.1 mg., 2660 mcg./mg., F–5; 6.9 mg., 2000 mcg./mg., and F–6; 7.65 mg., 800 mcg./mg. Yield was 66.3%.

Example 3.—A medium consisting of 2.0% sucrose, 2.5% soybean meal, 0.05% $MgSO_4 \cdot 7H_2O$, 0.1% $K_2HPO_4$, 0.3% NaCl, 0.0007% $CuSO_4 \cdot 5H_2O$, 0.0001% $FeSO_4 \cdot 7H_2O$, 0.0008% $MnCl_2 \cdot 4H_2O$, 0.0002%

$$ZnSO_4 \cdot 7H_2O$$

and 0.02% silicon (pH 7.0) was inoculated and shake-cultured at 28° C. for 6 days and yielded 3,030 ml. of broth filtrate containing macarbomycin at 0.66 mcg./ml. When treated by the procedure as described in Example 1, the filtrate gave 1.6596 g. (9.3 mcg./mg.) of crude powder, and the filter cake gave 28.2553 g. (4.2 mcg./mg.). In the same manner, two batches of other broth filtrate (2,400 ml. and 2,970 ml.) gave 2.0936 g. (9.0 mcg./mg.) and 1.678 g. (16.4 mcg./mg.), and their filter cakes afforded 14,2930 g. (6.4 mcg./mg) and 28.3876 g. (6.55 mcg./mg.), respectively. Combined crude powder (71.0143 g., 5.6 mcg./mg.) obtained from the filter cake was dissolved in 80 ml. of water and precipitated by adjusting to pH 3. The precipitate was redissolved by addition of alkaline, and lyophilized to yield 12.6202 g. (22.5 mcg./mg.). The supernatant at pH 3 was saturated with ammonium sulfate giving precipitation, which was redissolved in water by neutralization, dialyzed, and lyophilized. Thus, 2.1158 g. (46.4 mcg./mg.) of powder was obtained. Yield was 98.1%.

Example 4.—Crude powder (20.1671 g., 22.8 mcg./mg.) obtained by the procedure as described in Example 3 was dissolved in 500 ml. of water, and poured in a column (4 cm. in diameter) containing 750 ml. of DEAE cellulose (OH cycle, manufactured by Brown Co., Ltd.). The column was washed with each 500 ml. of distilled water, 0.5 M ammonium formate buffer (pH 7.9), and distilled water, and developed wih 0.1 M aqueous ammonia. The eluate was collected in 15 ml. fractions. The activity appeared from froction No. 10 to No. 67. The active fractions (Frs. 10–67, 1020 ml., 512 mcg./ml.) were combined and lyophilized to yield 2,63338 g. (194 mcg./mg.) of powder. The powder was purified by linear-gradient chromatography of ECTEOLA cellulose as described in Example 2. The active fraction (1,740 ml., 305 mcg./mg.) was subjected to a column of DEAE-cellulose (3 cm. in diameter, 60 cm. in length) concentrating to 298 ml. (1.335 mg./ml.) by the elution with 0.1 M aqueous ammonia. The solution was concentrated to 10 ml. under reduced pressure, and passed through a column of Sephadex G–50 (Coarse, 3 cm. x 60 cm.). The column was developed with distilled water and the eluate was collected in 15 ml. fractions. Frs. 14–18 contained 3.82 mg. of macarbomycin and Frs. 19–27 contained 424 mg. Frs. 19–27 (134 ml.) was concentrated and passed through a column containing Sephadex G–25 (2 cm. x 34 cm.). The column was developed with distilled water and the eluate was collected in 10 ml. fractions. Frs. 3–6 was lyophilized to give 195.3 mg. (1,108 mcg./mg.), and Frs. 7–9 to 152 mg. (735 mcg./mg.). All over yield was 79%.

Example 5.—Crude powder (9.734 g., 3.26 mcg./mg.) obtained by the procedure as described in Example 4 was dissolved with 175 ml. of distilled water, and poured into a column of Deae cellulose (4 cm. in diameter x 45 cm. in length). The column was washed with 500 ml. of distilled water, developed with 500 ml. of distilled water, developed with 500 ml. of 2 M formic acid in water eluting inactive dark brown solution, washed again with distilled water, developed successively with 500 ml. of 0.5 M ammonium formate buffer (pH 8.0), distilled water, 340 ml. of 0.1 M aqueous ammonia, 340 ml. of 0.2 M aqueous ammonia, 1360 ml. of 0.3 M aqueous ammonia, and 340 ml. of 0.4 M aqueous ammonia. The eluate was collected in 15 ml. fractions. The activity was eluted with 0.3 M aqueous ammonia and 396 ml. (885 mcg./ml.) was obtained at 100% yield. The active solution was concentrated and passed through a column containing Sephadex G–50 (3 cm. in diameter x 62 cm. in length). The column was developed with distilled water and the effluent was collected in 15 ml. fractions. 5.45 mg. of macarbomycin appeared in Frs. 13–17 and 278 mg. in Frs. 24–33. The yield was 87.7%. Frs. 24–33 was put on a column containing ECTEOLA cellulose (pretreated with pH 8.0 0.01 M Tris buffer; 3 cm. x 65 cm.), and gradually eluted as described in Example 2. When the eluate was collected in 15 ml. fractions, activity and absorbancy at 258 m$\mu$ appeared in the same fractions. Frs. 82–111 contained 161 mg. of macarbomycin, and Frs. 112–150 contained 47.5 mg. The yield was 75%. Frs. 82–111 was purified with a column of DEAE cellulose, passed through a column of Sephadex G–15 (2.5 cm. x 57 cm.). The column was developed with distilled water, and the effluent was collected in 15 ml. fractions. The activity appeared in Frs. 9–16, and then Frs. 9–10, 11–12, 13–14 and 15–16 were combined and lyophilized to yield 18.8 mg. (1080 mcg./mg.), 17.5 mg. (1220 mcg./mg.), 15.5 mg. (670 mcg./mg.) and 54.9 mg. (215 mcg./mg.) of white powder, respectively.

Example 6.—After 1400 ml. of cultured broth filtrate (44 mg. of macarbomycin) was adjusted to pH 3, precipitate deposited was filtered out and extracted with aqueous 70% acetone. The extract was concentrated to remove acetone, and 15 ml. of residual solution was extracted with 2×15 ml. of n-butanol at pH 2. The extract contained 23 mg. of macarbomycin at 52.3% yield, and was concentrated to 2 ml., and poured into a column containing 5 g. of Florisil. The column was washed with n-butanol, and eluted with methanol, yielding 10.9 mg. of macarbomycin in 85.2 ml. of eluate at 24.8% yield. A part of the eluate, 37.5 ml. (6.57 mg.), was concentrated to dryness, dissolved in a small amount of methanol, and poured into a column containing 5 g. of silica gel which had been pretreated with chloroform. The column was developed with mixtures of chloroform-methanol. Macarbomycin was eluted with a mixture (1:3) to obtain 6.9 mg. in 22 ml. of eluate at 25.2% yield. After removing the solvents, 10 mg. of brown powder (720 mcg./ml., 27.3% yield) was obtained.

Example 7.—Growth promoting effect of macarbomycin on chicks is illustrated below.

Macarbomycin was mixed uniformly with ration and administered to chicks to examine its effect on growth promotion and improvement of feed utilization.

One hundred and twenty chicks of broiler type (White Rock×White Cornish) were assigned to six lots of twenty chicks each (male and female in equal number) with two replicates per treatment. The trial lasted for eight weeks. The three treatments were:

Group 1 (Lot 1 and Lot 2 (Control)): Supplied only with basal ration
Group 2 (Lot 3 and Lot 4): Supplied with basal ration+Macarbomycin 2 g. (potency)/ton
Group 3 (Lot 5 and Lot 6): Supplied with basal ration+Macarbomycin 20 g. (potency)/ton As the basal ration, one of standard composition was used. Chick rearing was managed according to the usual method. Ration and drinking water were supplied ad libitum.

Results for weight gain and feed conversion are shown in Tables 6 and 7, respectively. Table 6 indicates beneficial effect of macarbomycin on chick growth promotion.

TABLE 6

| | Group 1 | Group 2 | Group 3 |
|---|---|---|---|
| Starter period of 4 weeks: | | | |
| Weight gain (kg.) | 430.6±56.3 | 496.9±57.3 | 502.9±55.2 |
| Index | 100 | ¹115 | ¹117 |
| Grower period of 4 weeks: | | | |
| Weight gain (kg.) | 744.7±126.9 | 800.3±138.5 | 887.8±123.5 |
| Index | 100 | 107 | ¹119 |
| Total period through 4 weeks: | | | |
| Weight gain (kg.) | 1,175.3±173.0 | 1,297.2±163.0 | 1,390.7+138.2 |
| Index | 100 | ¹110 | ¹118 |

¹ Significnat at 1% level.

TABLE 7

| | Group 1 | Group 2 | Group 3 |
|---|---|---|---|
| Starter period | 1.92 | 1.82 | 1.72 |
| Grower period | 2.61 | 2.70 | 2.67 |
| Total period | 2.36 | 2.37 | 2.32 |

Example 8.—Growth promoting effect of macarbomycin on swine is described below.

Macarbomycin was mixed uniformly with ration and administered to pigs to examine its effect on growth promotion and improvement of feed utilization.

Twenty-four young pigs (Middle Yorkshire×Landrace) of 71 days old were assigned to three lots of eight pigs each and fed for thirteen weeks.

Treatments for three lots were as follows:

Lot 1 (Control): Supplied only with basal ration
Lot 2: Supplied with basal ration+Macarbomycin 2 g. (potency)/ton
Lot 3: Supplied with basal ration+Macarbomycin 20 g. (potency)/ton As the basal ration, one of standard composition was used. Swine raising was managed according to the usual method. Each lot of eight pigs were fed in a concrete pen. Ration and drinking water were supplied ad libitum.

Results for weight gain and feed conversion are shown in Table 8 and Table 9, respectively. Table 8 indicates beneficial effect of macarbocycin on swine growth promotion.

TABLE 8

| | Lot 1 | Lot 2 | Lot 3 |
|---|---|---|---|
| Early grower period of 8 weeks: | | | |
| Weight gain (kg.) | 29.3±6.5 | 32.9±2.4 | 32.2±2.1 |
| Index | 100 | 112 | 110 |
| Later grower period of 5 weeks: | | | |
| Weight gain (kg.) | 20.7±5.6 | 26.4±2.9 | 23.4±2.0 |
| Index | 100 | ¹128 | 113 |
| Total period through 13 weeks: | | | |
| Weight gain (kg.) | 50.1±9.6 | 59.3±4.6 | 55.6±3.5 |
| Index | 100 | ¹118 | 111 |

¹ Significant at 5% level.

TABLE 9

| | Lot 1 | Lot 2 | Lot 3 |
|---|---|---|---|
| Early grower period of 8 weeks | 3.54 | 3.31 | 3.30 |
| Later grower period of 5 weeks | 4.13 | 3.82 | 3.96 |
| Total period through 13 weeks | 3.78 | 3.54 | 3.58 |

What we claim is:
1. The antibiotic macarbomycin which is effective in inhibiting the growth of Gram positive bacteria and in promoting the growth of poultry and stock animals, which forms a white to lightly yellow colored powder and does not show any clear melting point but decomposes at 190–200° C. with foaming, said substance exhibiting dextrorotation ($[\alpha]_D^{25}$ of its 0.5% aqueous solution +9.0°), being easily soluble in water, soluble in methanol and dimethylformamide, slightly soluble in ethanol, and scarcely soluble in acetone, n-butanol, ethyl acetate and benzene, but insoluble in n-hexane, exhibiting an absorption maximum of ultraviolet light at 258–269 m$\mu$ in aqueous solution

$$(E_{1\,cm.}^{1\%} = 103)$$

and in 0.1 N NaOH solution $$(E_{1\,cm.}^{1\%} = 105)$$

and at 243–247 m$\mu$ in 0.1 N HCl solution $$(E_{1\,cm.}^{1\%} = 68)$$

exhibiting characteristic absorption bands in the infrared region when pelleted with potassium bromide at the following wave numbers in cm.$^{-1}$: 3400, 2930, 1730(sh.), 1650, 1550, 1390, 1330, 1230, 1075, 1045, 970, 880, and 850, giving violet color by heating with 0.2% ninhydrine in 5% pyridine acetone solution, dark brown by Tollense, green by Benedict, and positive ornithine-HCl, and negative ferric chloride, Sakaguchi and biuret reactions, giving a single pattern of $S_{20,w} = 4.46$ by ultracentrifugation of its 0.6% aqueous solution at 59,730 r.p.m. from which a molecular weight of 35,000 is calculated by Yphantis's method, having an elemental analysis of C, 45.74%; H, 6.79%; N, 5.06%, O, 30.89%; P, 1.3% (Allen's method); ash 4.3% and giving 1.36% of calcium by Atomic Absorption Spectrophotometer (Perkin-Elmer, model 303), and giving by hydrolysis 9.7% of hexose as determined by orcinol method, 14% of hexosamine as described by Elson-Morgan's method, and 0.61% of pentose as determined by cysteine-$H_2SO_4$ method.

2. A process for the production of the antibiotic macarbomycin, which comprises cultivating Streptomyces phaeochromogenes ATCC No. 21346 in an aqueous solution containing carbohydrate and nitrogenous nutrient under aerobic conditions until a substantial amount of macarbomycin is accumulated in the culture, and then recovering the macarbomycin from the culture.

3. A process as claimed in claim 2 in which the cultivation is carried out under submerged aerobic conditions.

4. A process as claimed in claim 2 in which the macarbomycin is recovered from the culture by adding hydrochloric acid to the broth filtrate of the culture to precipitate the macarbomycin.

5. A process as claimed in claim 2 in which the macarbomycin is recovered from the culture by filtering the culture and extracting the filtration cake with methanol or acetone.

6. A process as claimed in claim 2 in which the macarbomycin is recovered from the culture by adding hydrochloric acid to the culture, to precipitate the macarbomycin, then filtering off the precipitated macarbomycin together with the mycelia cake therefrom and extracting the solids with methanol or acetone.

7. A process of promoting the growth of poultry and stock animals which comprises administering an effective growth promoting amount of macarbomycin as defined in claim 1 to said poultry and stock animals.

References Cited

Derwent: Farmdoc #38,668, Abstracting GE 1,814,623, published July 10, 1969.

JEROME D. GOLDBERG, Primary Examiner

U.S. Cl. X.R.

195—80